US006780448B1

(12) United States Patent
Howard

(10) Patent No.: US 6,780,448 B1
(45) Date of Patent: Aug. 24, 2004

(54) PASTEURIZATION OF FOOD PRODUCTS

(76) Inventor: David Howard, 2403 E. 25th Pl., Tulsa, OK (US) 74114-3215

( * ) Notice: Subject to any disclaimer, the term of this patent is extended or adjusted under 35 U.S.C. 154(b) by 246 days.

(21) Appl. No.: 09/777,472

(22) Filed: Feb. 6, 2001

(51) Int. Cl.$^7$ ............................... A23L 3/26; H05B 6/00
(52) U.S. Cl. ....................... 426/241; 219/388; 426/521
(58) Field of Search ............................. 426/241, 243, 426/520, 521, 643; 219/388

(56) References Cited

U.S. PATENT DOCUMENTS

| | | |
|---|---|---|
| 2,364,049 A | 12/1944 | Bensel |
| 2,779,681 A | 1/1957 | Sell et al. |
| 3,597,228 A | 8/1971 | Jeppson et al. |
| 3,906,115 A | 9/1975 | Jeppson |
| 3,961,090 A | 6/1976 | Weiner et al. |
| 3,966,980 A | 6/1976 | McGuckian |
| 4,391,862 A | 7/1983 | Bornstein et al. |
| 4,448,792 A | 5/1984 | Schirmer |
| 4,554,437 A * | 11/1985 | Wagner et al. .............. 219/388 |
| H762 H | 4/1990 | DeMasi et al. |
| 4,948,610 A | 8/1990 | Goglio |
| 5,269,216 A | 12/1993 | Corominas |
| 5,298,270 A | 3/1994 | Morgan |
| 5,356,649 A | 10/1994 | LaMotta et al. |
| 5,366,746 A | 11/1994 | Mendenhall |
| 5,374,437 A | 12/1994 | Corominas |
| 5,466,498 A | 11/1995 | Forloni et al. |
| 5,470,597 A | 11/1995 | Mendenhall |
| 5,512,312 A | 4/1996 | Forney et al. |
| 5,707,672 A * | 1/1998 | Taguchi et al. ............. 426/521 |
| 5,741,536 A | 4/1998 | Mauer et al. |
| 5,952,027 A | 9/1999 | Singh |
| 6,080,437 A * | 6/2000 | Mauer et al. ............... 426/521 |

OTHER PUBLICATIONS

Journal of Food Science, (1994), 59(1) 1–5.*
Unitherm Bulletin–"Browning in Traditional Continuous Ovens", Jul. 16, 1997.
"Application of Infra–red Radiation in Food Processing," Professor A.S. Ginzburg, Chemical and Process Engineering Series, 1969.
"Infra–Red Radiation for Food Processing II. Calculation of Heat Penetration During Intra–Red Frying of Meat Products," Magnus Dagerskog, ‚Lebensm.–Wiss u. Technol.. 12 252–257 (1979).
Heat Transfer and Food Products; Bengt Hallstron, et al., pp. 214–231, Elsevier Applied Science Publishers Ltd. 1988.
"Pasteurizing Protection," *The National Provisioner*, Apr. 1, 1999.
Studies on the Application of Infrared in Food Processing, Asselbergs, et al. presented at the 20th annual meeting, Institute of Food Technologists, May 17, 1960.
"Cooking Methods for Elimination of Salmonella typhimurium Experimentsl Surface Contaiminant From Rare Dry–Roasted Beef Roasts," L.C. Blankenship, et al., *Journal of Food Science*, vol. 45, (1980).
"Infrared Radiative Drying in Food Engineering: A Process Analysis," Constantine Sandu, *Biotechnology Progress*, (vol. 2, No. 3) Sep. 1986.

(List continued on next page.)

Primary Examiner—George C. Yeung
(74) Attorney, Agent, or Firm—Fellers, Snider, Blankenship, Bailey & Tippens, P.C.

(57) ABSTRACT

A process for preventing food-borne illness by pasteurizing the surface of a food product. The inventive process preferably comprises the step of heating the product surface in a manner effective to bring the temperature of the surface to at least 160° F. without causing any substantial change in color and without substantially changing the internal core temperature of the product. The heating step is also preferably conducted in a manner effective for achieving at least a 3 log reduction in live bacteria on the product surface. The inventive process is particularly well suited for treating precooked meat, poultry, and fish products.

33 Claims, 2 Drawing Sheets

OTHER PUBLICATIONS

"The A.G.S. Food System Chilled Pasteurized Food", COL. McGuckian, May 1969.

"The microbiological shelf life of vacuum packed broiled chickens," Mulder, et al., Speiderholt Institute for poultry research, the Netherlands, May, 1974.

Microbiological Stability of Pasteurized Ham Subjected to a Secondary Treatment in Retort Pouches, Delaquis, et al., *Journal of Food Protection*, vol. 49, No. 1, pp. 42–46, Jan. 1986.

"Food preservation by combined methods," L. Leister, *Food Research International 25*, 1992, pp. 151–158.

"Effects of Blade Tenderization, Vacuum Massage Time and Salt Level on Chemical, Textural and Sensory Characteristics of Precooked Chuck Roasts," S. D. Schackelford, et al., *Journal of Food Science*, vol. 54, No. 4, 1989.

"Reduction of *Listeria monocytogenes* in Precooked Vacuum–Packaged Beef Using Postpackaging Pasteurization," D. Kay Cooksey, et al., *Journal of Food Protection*, vol. 56, Dec. 1993, pp. 1034–1038.

"Survival of *Listeria monocytogenes* in Postpasteurized Precooked Beef Roasts," Margaret D. Hardin, et al., *Journal of Food Protection*, vol. 56, No. 8, pp. 655–660 (Aug. 1993).

"Food Preservation by Hurdle Technology," L. Leister, et al., pp. 511–520, Proceedings of the 1993 Food Preservation 2000 Conference, Oct. 19–21, 1993, Natick, Massachusetts.

"Food preservation by hurdle technology," Lothar Leister, et al., *Trends in Food Science & Technology*, Feb. 1995, (vol. 6), pp. 41–46.

"Extending the Shelf–Life of Chilled Ready Meals," Robert Shaw, *Meal Quality and Meat Packaging*, Jun. 23, 1998.

"New Methods of Food Preservation," edited by G. W. Gould, published 1995, Chapman & Hall.

"Reducing Process Variation in the Cooking and Smoking Process," Robert E. Hanson, *50th Annual Reciprocal Meat Conference*, vol. 50, 1997.

"Radiant Wall Oven Applications," © 1996, Pyramid Manufacturing.

"Shelf Life Extension and Pathogen Reduction of Fresh Chicken Through Surface Pasteurization Using Radian Heat and Anti–Microbial Agents," MD. Mahbubul Islam, for B. Astrakhan Technical Institue for Fisheries, USSR, 1981, Dissertation to the Graduate Faculty of the University of Georgia, Athens Georgia 1998.

"Extended Shelf Life Refrigerated Foods: Microbiological Quality and Safety," Elmer H. Marth, *Food Technology*, vol. 52, No. 2, Feb. 1998.

"Post Processing Pasteurization of Processed Meats," E. Jeffery Rhodehamel, et al., 2nd Annual Reciprocal Meat Conference, Jun. 20–23, O.S.U., Stillwater, OK.

"Basic aspects of food preservation by hurdle technology," Lothar Leistner, *International Journal of Food Microbiology*, 55 (2000).

* cited by examiner

PASTEURIZATION OF FOOD PRODUCTS

FIELD OF THE INVENTION

The present invention relates to processes and apparatuses for preventing food-borne illnesses by pasteurizing the surfaces of food products.

BACKGROUND OF THE INVENTION

In spite of increasingly stricter government regulations and ongoing efforts in the meat, fish and poultry industries, outbreaks of illnesses caused by food-borne bacteria continue to occur on a regular basis. In 1999 alone, 25 people in the United States died as a result of consuming contaminated meat or poultry products. The presence of any illness-causing bacteria on ready-to-eat (RTE) and other precooked meat, poultry, and fish products (e.g., sliced ham, beef, or turkey logs, Virginia hams, oven-roasted turkey, spiral honey-baked hams, etc.) is of particular concern because these products typically are not recooked or sufficiently reheated prior to consumption.

The threat posed to public health and safety by food-borne pathogens is extremely wide-spread and the economic impact of even a single outbreak can be staggering. Recently, one company issued a voluntary recall of approximately 16.7 million pounds of RTE turkey and chicken products because of possible contamination problems at just one of the company's processing facilities. It is reported that possible contamination problems were traced to the facility following the occurrence of certain illnesses identified by state health departments. The recalled products had been distributed nationwide and to some foreign countries.

Examples of particularly serious bacterial contaminants include listeria, salmonella, and *E-coli*. These contaminants are especially problematic when dealing with RTE and other precooked meat, poultry and fish products and are often present in processing environments in spite of diligent efforts to eliminate them. Listeria monocytogenes, for example, is tolerant to salt, can grow at low temperature, has a high heat tolerance, and can form stubborn biofilms on processing surfaces.

When dealing with RTE and other precooked products, the risk of contamination is particularly high after cooking and prior to completing the final packaging process. Such meat, poultry, and fish products are typically cooked to an internal temperature of at least 160° F. so that, at the end of the cooking process, no listeria, salmonella, or *E-coli* should be present. However, prior to packaging, the cooked product will typically be chilled or otherwise allowed to cool to an internal temperature of about 40° F. or less and can be contaminated by airborne pathogens and/or bacteria present on conveyor surfaces, on processing equipment, in condensate drippage, or on the hands of workers in the processing area.

In response to continuing outbreaks of food-borne illnesses, governmental regulatory agencies continue to impose stricter regulations. USDA and FDA authorities have now established zero tolerance requirements for listeria monocytogenes and salmonella in all RTE food products.

Unfortunately, as evidenced by the continuing occurrence of illnesses and deaths from food-borne bacteria, the current industry practices and procedures for dealing with these problems are not sufficiently reliable and are inadequate to meet the zero tolerance requirements now imposed by regulatory agencies. Current procedures commonly consist of maintaining the cooked product in a "clean" environment (a "clean room") and conveying the product along a critical control path designed to prevent bacteria from reaching the product surfaces. In an effort to keep the processing environment clean, the air within the clean environment is typically filtered and operators are instructed to wash all contact surfaces between shifts and to wash their hands each time they enter the clean area.

It is thus apparent that a need presently exists for a process which will consistently and effectively kill surface bacteria present on food products, particularly on RTE and other precooked meat, poultry, and fish products, and will meet and exceed all governmental regulatory requirements. A need particularly exists for such a process which will not alter the surface characteristics or internal characteristics of the products in any significant way.

SUMMARY OF THE INVENTION

The present invention provides a surface pasteurizing system which satisfies the needs and alleviates the problems discussed above. The inventive system can be used for pasteurizing the surface of generally any raw or cooked food product and is particularly well suited for treating precooked whole muscle, emulsified, or other meat, poultry and fish products. In its most preferred embodiments, the inventive system is effective for destroying bacteria without producing any substantial change in the color or other characteristics of the product.

In one aspect, the present invention provides a process for preventing food-borne illness comprising the step of heating a surface of a food product in a manner effective to achieve at least a 3 log reduction in live bacteria on the surface without causing any substantial color change (i.e., any change in color readily discernable by the naked eye) in the surface.

In another aspect, the present invention provides a process for preventing food-borne illness comprising the step of heating a surface of a food product to a temperature of at least 160° F., the step of heating being conducted in a manner effective such that no substantial increase in the internal core temperature of the food product (i.e., no increase amounting to as much as 1° F. or more) occurs.

In yet another aspect, the present invention provides a process for preventing food-borne illness comprising the steps of (a) continuously conveying a precooked food product through a continuous infrared oven at an operating temperature of at least 500° F. and (b) heating a surface of the precooked food product in the infrared oven for a time sufficient to bring the surface to a temperature of at least 160° F. The food product is selected from the group consisting of meat, poultry, and fish products.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1:
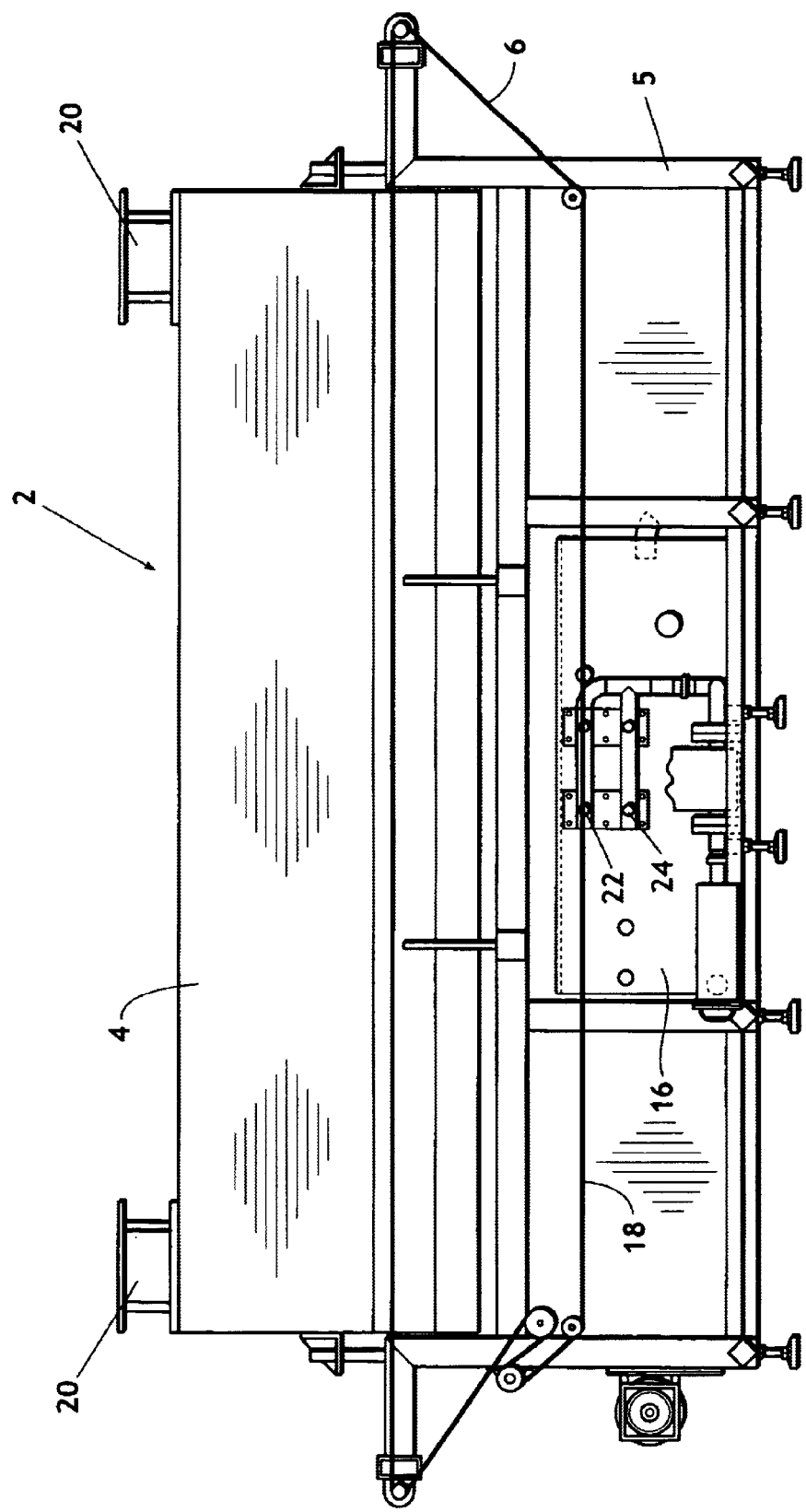
FIG. 1 provides an elevational side view of an embodiment 2 of an infrared oven preferred for use in the inventive system.

As indicated above, the inventive surface pasteurization process is effective for treating generally any type of cooked or raw food product. The inventive process is particularly well suited for treating ready-to-eat and other precooked meat, poultry and fish products. Examples of whole muscle and emulsified products treatable by the inventive process include, but are not limited to: Virginia hams, spiral honey-baked hams, oven-roasted turkey or turkey portions, oven-roasted chicken or chicken portions, and processed slicing logs (e.g. ham, beef or turkey logs).

In the inventive process, the surface of the product in question is exposed to an elevated temperature for a period of time effective to achieve a desired bacteria kill rate or kill ratio. The temperature and time of exposure employed in the inventive process are preferably sufficient for achieving at least a 3 log reduction, more preferably at least a 4 log reduction, in live bacteria on the product surface. The temperature and exposure period employed in the inventive process will most preferably be effective for achieving such results without producing any discernable change in the surface color or other characteristics (e.g., texture, moisture content, color, taste, and shape of the product).

The inventive process can be used for treating the products in either a batch, a semi-continuous, or a continuous manner. To ensure that an acceptable kill ratio is achieved, the surface of the product will preferably be heated to at least 160° F. and will most preferably be heated to at least 180° F. Prior to beginning the inventive process, the temperature of the product will rarely, if ever, exceed 160° F. and most commonly will not exceed 40° F. The temperature and residence time employed in the inventive process will preferably be effective for heating the surface of the product to the desired temperature without producing any change in temperature at the center most internal core of the product.

In conducting the inventive process, the surface of the product will preferably be exposed to a temperature of at least 500° F. for a period of less than about three minutes. The exposure period will typically be in the range of from about 15 seconds to about three minutes. The surface of the product will more preferably be exposed to a temperature of at least 700° F. (most preferably at least 750° F.) for a period of less than about two minutes (most preferably less than about one minute). In a particularly preferred embodiment, the surface of the product will be exposed to an average temperature of about 1000° F. for a period in the range of from about 25 seconds to about 1 minute.

When used for continuously treating food products, the inventive process preferably comprises the steps of (a) heating the surface of the product by continuously delivering the product through a continuous oven or other continuous heating apparatus and (b) packaging the product within a relatively short period of time following the heating step so that the risk of recontamination is minimized. The period of time between the heating step and the packaging step will preferably not exceed one hour and will more preferably be less than 10 minutes. After more than one hour, the surface temperature of the product will typically have decreased to substantially match the colder temperature in the interior of the product. To optimize, preserve, and best maintain the desired effects of the inventive process, the product will most preferably be packaged within not more than five minutes after the completion of the heating step.

The heating apparatus employed in the inventive process will preferably comprise a high intensity heat source. Additionally, the heating apparatus will preferably be constructed and operated such that air flow therein is minimized. Minimizing or eliminating turbulence within the heating apparatus reduces the degree to which heat is conducted to the interior of the product.

The heat source employed in the inventive process will most preferably be an infrared oven (e.g., an electric infrared oven or a gas infrared oven). The high intensity heat provided by an infrared oven can quickly heat the surface of the product to the desired pasteurization temperature without changing the surface color, internal temperature, or other characteristics of the product.

Other heating apparatuses such as steam ovens and hot air convection or impingement ovens can also be used in the inventive process but are less desirable. Steam ovens operate at much lower temperatures and therefore require much higher residence times. Consequently, a much greater amount of heat is conducted into the body of the product. As for hot air convection and impingement ovens, the circulation effects created therein can, in some cases, increase the depth of penetration experienced in the heating step in a manner which may change the surface color and other characteristics of the product.

Figure 2:
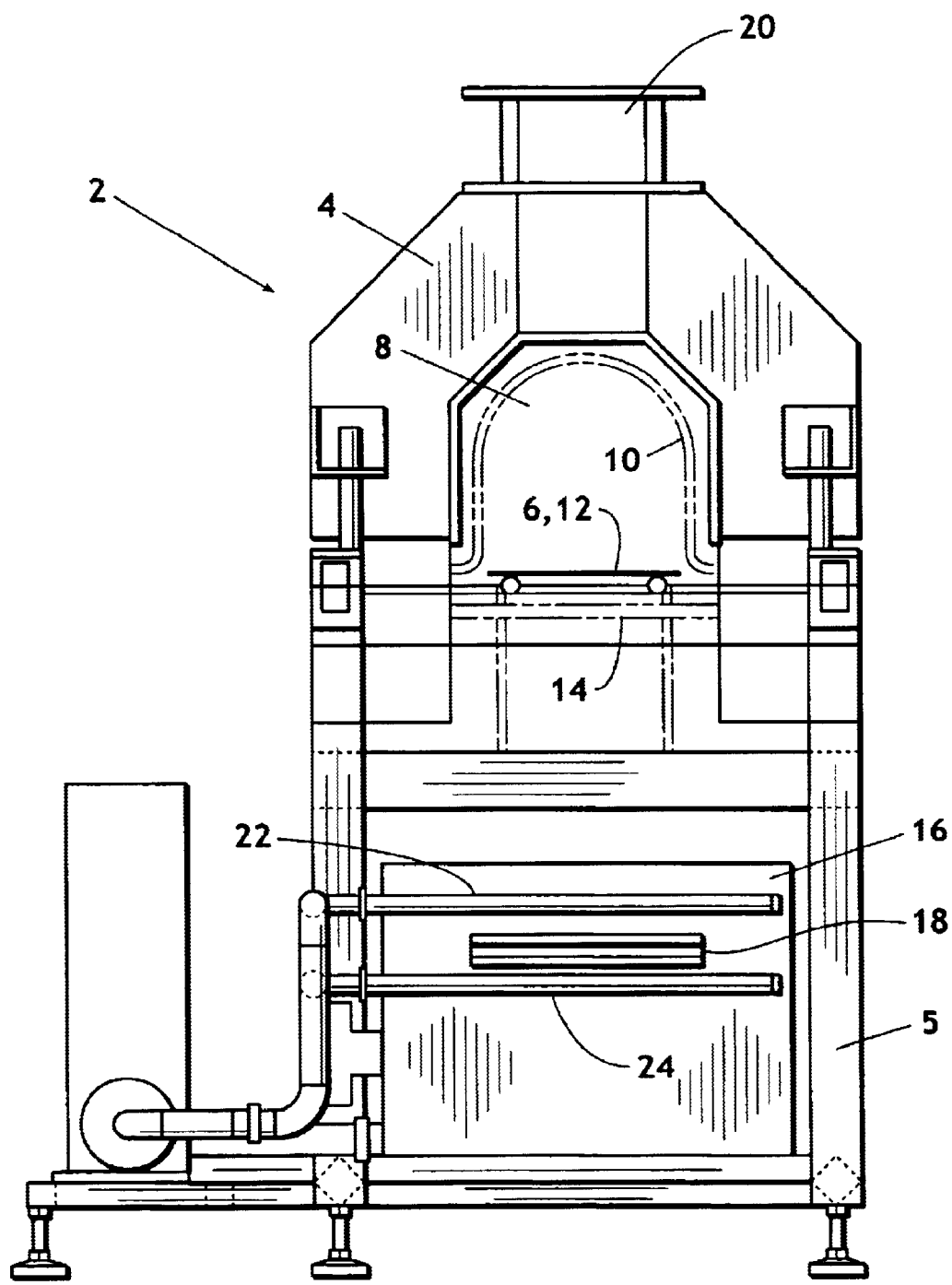
FIG. 2 provides an elevational end view of infrared oven 2.

An embodiment 2 of a continuous infrared oven particularly well suited for use in the inventive process is depicted in FIGS. 1 and 2. Oven 2 is an electric infrared oven comprising: an elongate insulated housing 4 supported on a frame 5; a conveyor 6 having an upper, carrying run 12 extending longitudinally through housing 4; U-shaped inlet and outlet end openings 8; a series of lateral, U-shaped electric infrared elements 10 positioned within housing 4 above the carrying run 12 of conveyor 6; a series of lateral, electric infrared elements 14 positioned within housing 4 beneath the carrying run 12 of conveyor 6; a belt washer assembly 16 positioned beneath housing 4 for cleaning the return run 18 of conveyor 6; and overhead ducts 20 provided in housing 4 above the inlet and outlet openings 8 thereof for venting hot air from the oven so that the air does not otherwise escape into and heat the area surrounding oven 2. Belt washer assembly 16 preferably includes lateral conduits 22 and 24 above and below the return run 18 of conveyor 6 for cleaning conveyor 6 with a high pressure water spray sufficient to discharge cinders and other particles from the belt.

Conveyor 6 is preferably a stainless steel wire belt or other type of open belt which will allow the infrared energy from lower elements 14 to directly irradiate the lower surfaces of the products. The inverted, U-shaped upper infrared elements 10 desirably surround and directly irradiate the remaining side and upper surfaces of the products. Additionally, the size and shape of the inverted U-shaped upper infrared elements 10 and of inlet and outlet openings 8 of oven 2 will allow even large products such as whole turkeys and hams to be conveyed through oven 2 without difficulty.

Although the inventive process can proceed directly from the heating step to the packaging step, examples of additional processing steps which can be conducted between heating and packaging include, but are not limited to, slicing, application of rubs, and application of glaze.

EXAMPLES

In tests conducted using a continuous infrared oven 2 of the type depicted in FIGS. 1 and 2, a 6 log reduction in surface bacteria was achieved after 45 seconds at an average operating temperature of 800° F. No discernable change in the color or other characteristics of the surfaces of the products occurred. In additional tests conducted on ham logs and turkey logs, surface temperatures of greater than 180° F. were achieved in less than one minute with no effect on the surface color or sliceability of the product.

In further tests of the inventive process, a 3 log reduction in bacterial activity was achieved even when treating products inoculated with antibiotic-resistant strains of listeria. In these tests, the inoculated product was heated in an electric infrared oven for one minute at a temperature of 1,200° F.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A process for pasteurizing an outer surface of a food product wherein said outer surface extends around said food product and said food product has already been cooked, said process comprising the steps of:
   (a) exposing said outer surface to infrared energy by continuously conveying said food product through an infrared oven and then
   (b) packaging said food product,
   wherein step (a) is conducted in a manner such that substantially no change in color is produced in said outer surface and wherein substantially no additional heating of said food product occurs between steps (a) and (b).

2. The process of claim 1 wherein no intervening cooling step is performed between steps (a) and (b).

3. The process of claim 1 wherein said food product has an internal core temperature and wherein step (a) is conducted in a manner such that no substantial increase in said internal core temperature occurs.

4. The process of claim 3 wherein said outer surface is exposed to said infrared energy in step (a) in a manner effective for achieving at least a 3 log reduction in live bacteria on said outer surface.

5. The process of claim 1 wherein said outer surface is exposed to said infrared energy in step (a) in a manner effective for achieving at least a 3 log reduction in live bacteria on said outer surface.

6. The process of claim 1 wherein said infrared oven is operated in step (a) at an oven temperature of at least 700° F.

7. The process of claim 6 wherein said oven temperature is at least 750° F.

8. The process of claim 1 wherein said food product is selected from the group consisting of precooked meat products, precooked poultry products, and precooked fish products.

9. The process of claim 1 wherein said food product is selected from the group consisting of precooked emulsified meat products, precooked whole muscle meat products, precooked emulsified poultry products, and precooked whole muscle poultry products.

10. The process of claim 9 wherein said food product is a slicing log.

11. The process of claim 9 wherein said food product is a whole muscle turkey breast.

12. A process for surface pasteurizing a food product which has already been cooked, said food product having an outer surface which surrounds said food product and said process comprising the step of exposing said food product to infrared energy by continuously conveying said food product through an infrared oven, wherein said food product is substantially surrounded laterally by infrared elements as said food product is conveyed through said infrared oven such that substantially all of said outer surface of said food product is directly irradiated with said infrared energy.

13. The process of claim 12 wherein said infrared oven further comprises a conveyor having a carrying run on which said food product is continuously conveyed through said infrared oven, said food product having a bottom portion residing on said carrying run and said conveyor being effective such that said bottom portion is directly irradiated with said infrared energy as said food product is conveyed on said carrying run.

14. The process of claim 13 wherein said conveyor comprises a stainless steel wire belt.

15. The process of claim 13 wherein said food product has sides extending upwardly from said bottom portion and said infrared elements include elements having at least portions of which are positioned adjacent said sides for directly irradiating said sides as said food product is conveyed on said carrying run.

16. The process of claim 12 wherein said step of exposing is conducted in a manner such that substantially no color change occurs in said outer surface.

17. The process of claim 12 wherein said process further comprises the step, after said step of exposing, of packaging said food product and wherein no additional heating of said food product occurs between said step of exposing and said step of packaging.

18. The process of claim 12 wherein said food product is exposed to said infrared energy in a manner effective for achieving at least a 3 log reduction in live surface bacteria.

19. The process of claim 12 wherein said infrared oven is operated in said step of exposing at at least 700° F.

20. The process of claim 12 wherein said process further comprises the step, after said step of exposing, of packaging said food product and wherein no intervening cooling step is performed between said step of exposing and said step of packaging.

21. The process of claim 12 wherein said food product has an internal core temperature and wherein substantially no increase in said internal core temperature occurs in said step of exposing.

22. A process for surface pasteurizing a food product which has already been cooked, said process comprising the step of exposing said food product to infrared energy by continuously conveying said food product through an infrared oven, wherein said infrared oven includes:
   a conveyor having a carrying run on which said food product is continuously conveyed through said infrared oven;
   a plurality of arched lateral upper infrared elements positioned over said carrying run; and
   a plurality of lower infrared elements positioned below said carrying run.

23. The process of claim 22 wherein said arched lateral upper infrared elements have an inverted U-shape.

24. The process of claim 22 wherein said food product has a bottom portion which rests on said carrying run and said conveyor is effective for allowing said lower infrared elements to directly irradiate said bottom portion with said infrared energy through said carrying run.

25. The process of claim 24 wherein said conveyor comprises a stainless steel wire belt.

26. The process of claim 22 wherein said upper and said lower infrared elements substantially surround all of said food product laterally as said food product is conveyed through said infrared oven.

27. The process of claim 22 wherein said process further comprises the step, after said step of exposing, of packaging said food product and wherein no additional heating of said food product occurs between said step of exposing and said step of packaging.

28. The process of claim 27 wherein said infrared oven is operated in said step of exposing at at least 700° F.

29. The process of claim 22 wherein said food product is exposed to said infrared energy in a manner effective for achieving at least a 3 log reduction in live surface bacteria.

30. The process of claim 22 wherein said infrared oven is operated in said step of exposing at at least 700° F. and said food product has a residence time in said infrared oven of not more than two minutes.

31. The process of claim 22 wherein said process further comprises the step, after said step of exposing, of packaging said food product and wherein no intervening cooling step is performed between said step of exposing and said step of packaging.

32. The process of claim 22 wherein said food product has an internal core temperature and wherein substantially no increase in said internal core temperature occurs in said step of exposing.

33. The process of claim 22 wherein said step of exposing is conducted in a manner such that substantially no surface color change of said food product occurs.

* * * * *